United States Patent [19]

Armstrong

[11] 4,273,955

[45] Jun. 16, 1981

[54] SYSTEM FOR IN-SERVICE QUANTITATIVE PERFORMANCE ANALYSIS OF DATA COMMUNICATIONS SYSTEM

[75] Inventor: Thomas R. Armstrong, Largo, Fla.

[73] Assignee: Paradyne Corporation, Largo, Fla.

[21] Appl. No.: 17,041

[22] Filed: Mar. 2, 1979

[51] Int. Cl.³ .................... G06F 11/00; H04J 1/10; H04B 1/72; H04M 1/24

[52] U.S. Cl. .................... 178/69 G; 179/175.2 G; 370/13

[58] Field of Search .............. 179/15 BF, 15 FD; 178/3, 69 G; 370/13, 14, 17, 69, 76

[56] References Cited

U.S. PATENT DOCUMENTS

| 3,839,707 | 10/1974 | Woodward et al. | 179/15 BF |
| 4,013,840 | 3/1977 | Anderson | 179/15 FD |
| 4,055,808 | 10/1977 | Holsinger et al. | 178/69 G |
| 4,138,599 | 2/1979 | Munter | 179/15 BF |

Primary Examiner—Thomas A. Robinson
Attorney, Agent, or Firm—Gerald Levy

[57] ABSTRACT

A data communication system is provided comprising, at a plurality of locations, data terminal equipment. Communication equipment adapted to transmit and/or receive data from location to location is provided at each location connected to the terminal equipment and interconnected between locations through a suitable communications channel or media. An auxiliary signal processor is provided at each location interfaced with the communications equipment and deriving from the communications equipment on a noninterfering basis, information relating to the status of the channel, communications equipment, and data terminal equipment. A central controller is provided at a central location and auxiliary communication equipment is provided at each location interconnected with the central controller and with the auxiliary signal processor.

4 Claims, 3 Drawing Figures

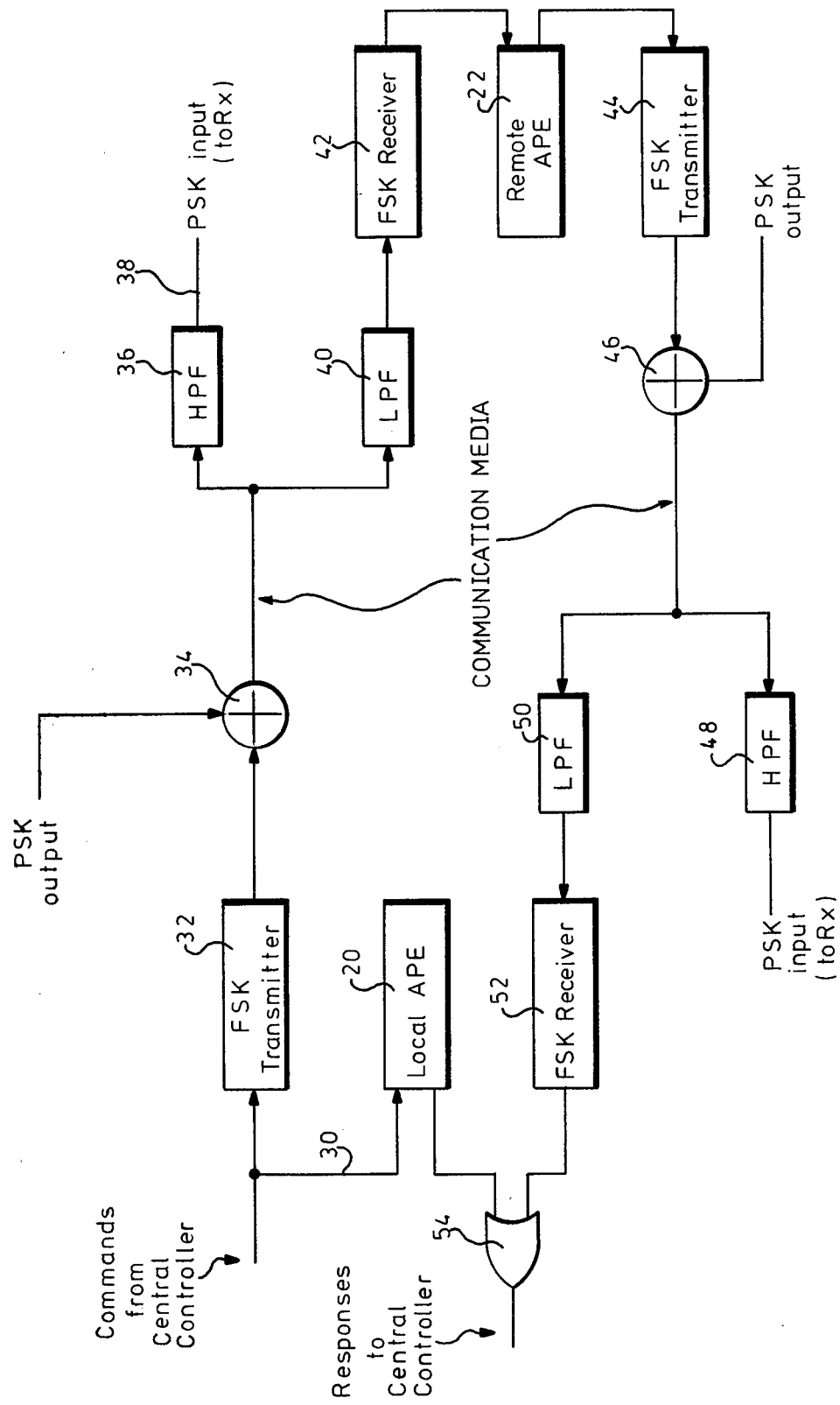

SYSTEM FOR IN-SERVICE QUANTITATIVE PERFORMANCE ANALYSIS OF DATA COMMUNICATIONS SYSTEM

BACKGROUND OF THE INVENTION

The invention relates to data communications and in particular to a system for the detection and correction of faults in a data communications network from a central location.

In my copending, commonly assigned patent application, System For The Quantitative Measurement Of Impairments In The Communication Channel Of A Quadrature Amplitude Modulation Data Communication System, Ser. No. 16,912, filed Mar. 2, 1979 there is disclosed a technique for QAM eye pattern analysis which permits the quantitative evaluation of a communications channel or media interconnecting two remote communication equipments of a data communication network. The communications equipment, in the form of transmit and/or receive modems may be interconnected by a communication channel comprising dedicated or dialed up commercial, military or foreign voice-grade telephone lines and include PCM, carrier, satellite and cable links.

In my copending, commonly assigned patent application, In-Service Monitoring System For Data Communications Network, Ser. No. 17,042, filed Mar. 2, 1979 there is disclosed a technique for the non-interfering monitoring of the components of a data communications network including the detection and isolation of faults and potential failures within the network.

The techniques disclosed in the above mentioned patent applications solve many long felt needs since they permit the evaluation of the communication of data from location to location without interfering with such data communication. The systems also permit potential future problems to be located and corrected prior to a degradation of the communications system to a point where it interferes with data transmission.

While these copending cases solve many of the problems heretofore encountered they still require that at each location of a data communications network a monitoring function be performed. For multi-location networks this would be both costly and time consuming.

In view of the above, it is the principal object of the present invention to provide a system whereby the monitoring of the condition of components of a multi-location data communications network may be attained from a central location.

A further object is to provide such a system wherein adjustment or reconfiguration of the components of the network at the several remote sites may be attained from the central location.

Still further objects and advantages will be apparent from a review of the detailed description of a preferred embodiment of my invention.

SUMMARY OF THE INVENTION

The above and other beneficial objects and advantages are attained in accordance with the present invention by providing a data communications network consisting of data terminal equipment provided at at least two locations remote from each other. At each location, transmit and/or receive communications equipment is connected to the data terminal equipment and interconnected through a suitable communications channel, media or links. Auxiliary signal processors are provided at each location interfaced with the communications equipment and adapted to derive, on a non-interfering basis, information from the communications equipment relative to the status of the data terminal equipment, communications equipment, and communications channel.

An auxiliary communications equipment is also provided at each location interfaced with the auxiliary signal processor thereat. A central controller is provided at a central location which could, if desired, be the location of one of the data terminal equipments. The auxiliary communications equipments are each interconnected, through a communications link, with the central controller thereby providing a telemetry interface between the central controller and the auxiliary signal processors.

The auxiliary communications equipment may be comprised for example, of a low speed FSK modem which transfers data in a portion of the communications media bandwidth which is not utilized for normal data traffic. In a system which utilizes 2400 bps modems for the communications equipment which operate within a frequency range of 1000 Hz to 2,600 Hz for data traffic, the auxiliary communications equipment may operate at a rate of 110 bps within a frequency range of 340 Hz to 540 Hz.

BRIEF DESCRIPTION OF THE DRAWINGS

In the accompanying drawings:

FIG. 2 is a schematic block diagram of the auxiliary communications equipment utilized in the system of the present invention.

DETAILED DESCRIPTION OF THE PREFERRED EMBODIMENT

Figure 1:
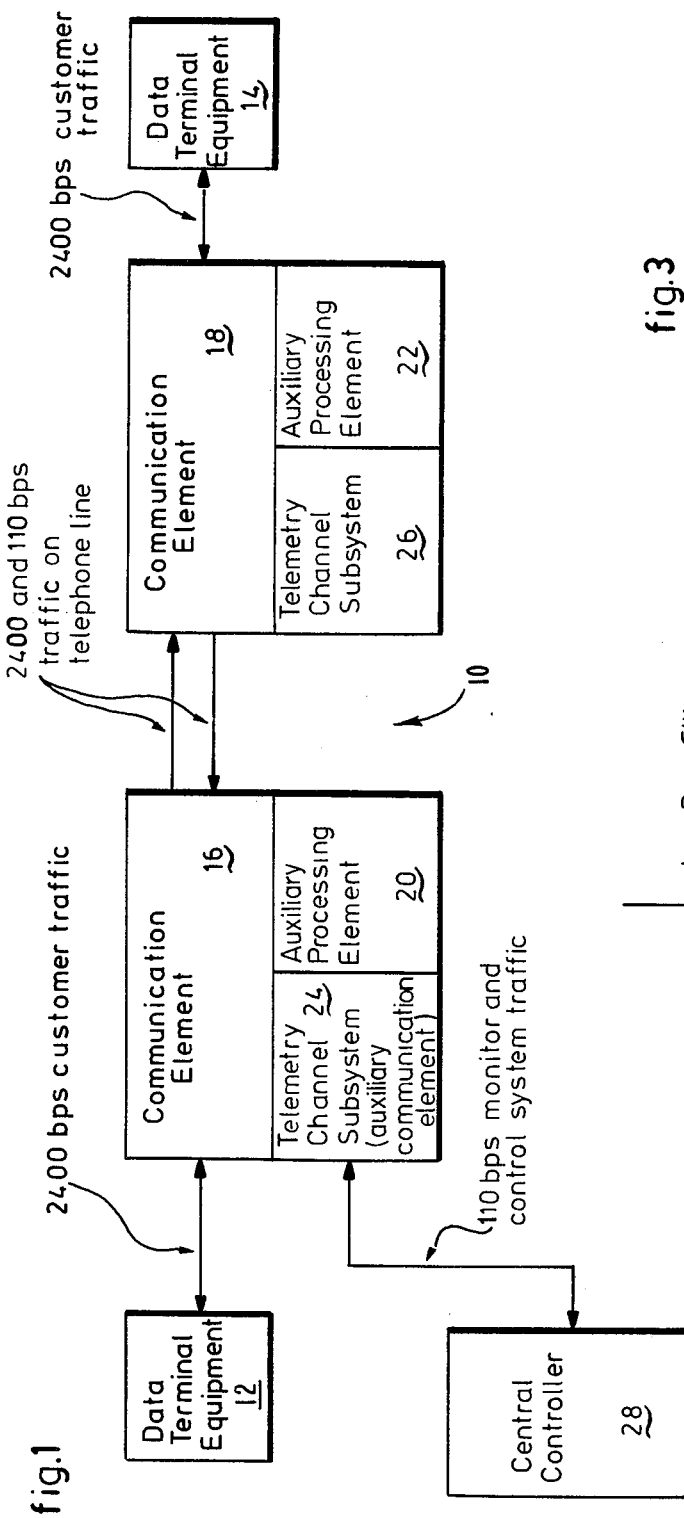
FIG. 1 is a schematic block diagram of the system in accordance with the present invention.

Reference is now made to the drawings and to FIG. 1 in particular wherein a data communications system 10 in accordance with the present invention is depicted. The system comprises at least two data terminal equipments 12 and 14 provided at locations remote from each other. At each location there is also located communications equipment 16 (or 18). The communications equipment are in the form of transmit/receive modems and pass customer data to each other over a suitable communications media or channel such as a telephone link.

In the preferred embodiment, the modems 16 and 18 employ PSK modulation transferring data at a rate of 2400 bps. The modems 16 and 18 are connected to their associated data terminal equipment 12 and 14 by means of an RS232-C interface in a manner described in more detail in the previously mentioned application Ser. No. 17,042, filed Mar. 2, 1979 for In-Service Monitoring System For Data Communications Network.

At each location there is also provided an auxiliary processing element 20 (or 22). Preferably the auxiliary processing element is contained in the same chassis as the communications element 16 (or 18). The details of the interface between the auxiliary processing element 20 (or 22) and communications element 16 (or 18) are also set forth in the previously mentioned copending applications.

In accordance with the present invention, there is also provided an auxiliary communications element at each location. Accordingly, a telemetry channel subsystem 24 is provided at the location of modem 16, and preferably within the same chassis and similarly a telemetry channel subsystem 26 is provided at the location of modem 18, preferably within its chassis.

The inputs and outputs of the auxiliary processing elements 20 and 22 are provided from and to the telemetry channel subsystems 24 and 26 respectively which comprise FSK modems which operate at a data rate of 110 bps.

Commands to the telemetry channel subsystems and information from them are provided to a central controller 28. The central controller 28 may be provided at the location of one of the data terminals or at a different location. The central controller comprises a mini-computer such as, for example, the model TI 990/10 available from the Texas Instruments Corp.

Reference is now made to FIG. 2 wherein the telemetry channel subsystem is depicted.

As shown, data or commands from the central controller pass to a local auxiliary processing equipment 20 along line 30. The data from the central controller is also supplied to a local FSK transmitter 32. The output of FSK transmitter 32 is fed to an adder 34 along with the output of a PSK transmitter and supplied to the telephone line. At the remote end, a high pass filter 36 is provided to remove the low frequency FSK and pass the resultant PSK signal to the PSK receiver along line 38. A low pass filter 40 is also provided to remove the PSK from the composite signal and to supply the remaining FSK signal to the FSK receiver 42. The FSK receiver output is fed to the remote auxiliary processing element 22.

Data from auxiliary processing element 22 is provided to the FSK transmitter 44 within its co-located auxiliary communications element 26. The data signal is summed, through adder 46 with the PSK transmitter output of modem 18. The composite output at the remote site is connected to a telephone channel and thereby to the local site (i.e., the location of communications equipment 16). High and low pass filters 48 and 50 separate the composite PSK and FSK signals at the local site and feed them respectively to the PSK input and FSK receiver 52. The FSK receiver data output is combined by means of OR gate 54 with the output of local auxiliary processing equipment 20 and fed to the central controller.

As will be noted from the following detailed description of the relationship between the auxiliary communications equipments and central controller, a key feature of the central controller is that it continually addresses and queries each auxiliary processing equipment in the network as to the status of that auxiliary processing equipment, the corresponding communications equipment, the corresponding data terminal and the status of the communications media with regard to channel impairments. If the equipments at the site queried are not in a normal state, an alarm response is returned to the central controller from the queried auxiliary processing equipment. The alarm response also includes both the address or identification of the auxiliary processing equipment generating the alarm as well as the class of parameter which is not within normal limits and generated the alarm.

Figure 3:
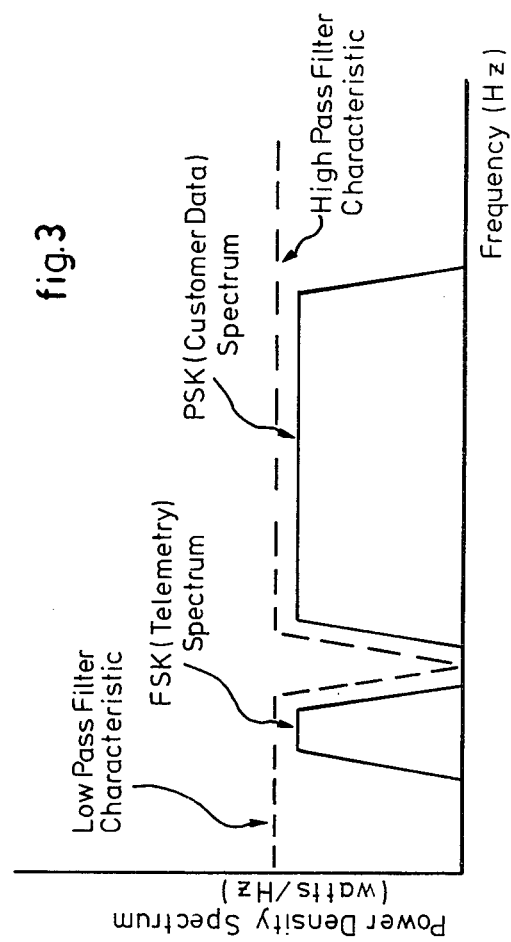
FIG. 3 is a waveform diagram depicting the separation of data and telemetry information.

FIG. 3 presents the output spectra of the PSK transmitter and FSK transmitter. The PSK energy is in a frequency band of 1,000 to 2,600 Hz and the FSK energy is in a frequency band of 340 to 540 Hz. Hence, both these signals may be simultaneously transmitted on a telephone channel without mutual interference. Also shown in FIG. 3 are the characteristics of high pass and low pass signal separating filters.

The command or interrogation signalling formats used by the central controller 28 is one of two types. Type 1 interrogations are used when the central controller automatically polls each auxiliary processing element 20 and 22 as to whether or not the auxiliary processing element has determined that any parameters relating to its data terminal equipment, communication media, communications equipment or the auxiliary processing equipment itself are at alarm level. The poll format expressed in bits is $000A_1A_2A_3A_4A_5P1$. The first bit is set to 0 to indicate a start bit of the character. The next two bits are set to 0 also. Next five address bits $A_1$ through $A_5$ occur. A parity check of the preceding seven bits follows and finally a 1 is included to indicate the end of the character. A second word composed of $$0A_6A_7A_8A_9FFFP1$$

follows. The first bit is again a 0 to indicate start of character. Next four more address bits follow. Three format indicator bits, indicated by FFF follow. Finally, a parity bit and a 1 to indicate end of character are included.

If the format indicator bits are 000, the message is an auto scan query and the total message length is two characters.

If the format indicator bits are 001, the query contains a third character. This third character contains a specific command. The bit pattern for the command character is $$0C_1C_2C_3C_4C_5C_6C_7P1$$

where the $C_k$s are employed to indicate the specific command type.

The response of the auxiliary processing equipment to an autoscan poll may be one of two types. If no parameters have reached an alarm limit level, the auxiliary processing equipment echoes back the query. If an alarm has occurred, the auxiliary processing equipment echoes the query plus two additional characters which indicate the cause(s) of the alarm(s). The 14 data bits contained in the two characters contain the following information:

| | |
|---|---|
| B1 | DTE interface Alarm |
| B2 | Phase Jitter Alarm |
| B3 | Signal to Noise Ratio Alarm |
| B4 | Signal Quality Alarm |
| B5 | Received Signal Level Alarm |
| B6 | Power Supply Voltage Alarm |
| B7 | Spare |
| B1 | Standby CE Alarm |
| B2 | CE in Test Mode |
| B3 | Message Front Panel Switch ON |
| B4 | Spare |
| B5 | External Input ON |
| B6 | Spare |
| B7 | Spare |

The response to the status query is a 32 character message which is composed of the following characters:

| | |
|---|---|
| $CH_1$-$CH_2$ | Address |
| $CH_3$-$CH_6$ | Status as detailed below |
| $CH_7$ | Phase Jitter Value |
| $CH_8$ | Spare |
| $CH_9$-$CH_{10}$ | Sum of $c^2$ |
| $CH_{11}$-$CH_{12}$ | Sum of $d^2$ |
| $CH_{13}$ | CE Power Supply Voltage Value |
| $CH_{14}$ | Received Signal Level Value |
| $CH_{15}$-$CH_{16}$ | LSD Alarm Timer Limit Value |
| $CH_{17}$-$CH_{18}$ | RTS Alarm Timer Limit Value |
| $CH_{19}$-$CH_{20}$ | CTS Alarm Timer Limit Value |
| $CH_{21}$ | RLS Alarm Limit Value |
| $CH_{22}$ | Phase Jitter Alarm Limit Value |
| $CH_{23}$-$CH_{24}$ | SNR Alarm Limit Value |
| $CH_{25}$ | Status as detailed below |
| $CH_{26}$ | Frequency Offset Value |
| $CH_{27}$ | Release Number of ROMS in APE |
| $CH_{28}$-$CH_{32}$ | Spare |

The 35 status bits in characters three, four, five, six and 25 are defined as follows:

| | |
|---|---|
| B1 | Transmit Data Activity - normal or alarm |
| B2 | Receive Data Out - normal or alarm |
| B3 | Transmit Clock Out - normal or alarm |
| B4 | Receive Clock - normal or alarm |
| B5 | Signal Quality - good or bad |
| B6 | CE Muted - yes or no |
| B7 | CE in Test Mode - yes or no |
| B8 | ROM Release Number in Character 27 - yes or no |
| B9 | CE 5v Supply Voltage - normal or alarm |
| B10 | Standby CE 5v Supply Voltage - normal or alarm |
| B11 | Analog Loopback - enabled or disabled |
| B12 | Digital Loopback - enabled or disabled |
| B13 | APE Self-test - passed or failed |
| B14 | CE Self-Test - passed or failed |
| B15 | DTE CTS - normal or alarm |
| B16 | DTE RTS - normal or alarm |
| B17 | Line Signal Detect - normal or alarm |
| B18 | CE Local Test Mode - yes or no |
| B19-B20 | CE Type<br>01 is 4800<br>10 is 2400<br>11 is 9600 |
| B21 | Standby CE Available - yes or no |
| B22 | Data Set Ready - on or off |
| B23 | Data Terminal Ready - on or off |
| B24 | CE Stream Disabled - yes or no |
| B25 | CE Rate - high or low |
| B26 | Dial Line Connected - yes or no |
| B27 | Auto Answer - enabled or disabled |
| B28 | CE is - remote or master |
| B29 | CE in Control is - main or standby |
| B30 | Standby CE Self-Test - pass or fail |
| B31 | Customer Data Lines - leased or dialed |
| B32 | Telemetry Data Lines - leased or Dialed |
| B33 | Standby CE - present or absent |
| B34 | Dial Backup Equipment - present or not present |
| B35 | Dial Under APE Control - yes or no |

From a study of the two responses which have been discussed in detail, it is obvious that the central controller 28 may assess the condition of all communication equipment, auxiliary processing equipment, and the parameters which relate to the condition of the communication media in both directions. Additionally, as discussed in the previously mentioned copending applications, the information is obtained without interruption of normal customer data traffic. Numerous other commands may also be employed to provide reconfiguration functions such as:

| | |
|---|---|
| 1. | Switch in standby CE |
| 2. | Change data rate of CE |
| 3. | Cause CE to answer dialed call |
| 4. | Cause CE to perform bit error rate test |
| 5. | Cause CE to perform detailed out-of-service self test |
| 6. | Turn off CE |

Hence, an operator at the central controller location may assess the performance of the total communication network and all elements of the network. Moreover, he may reconfigure the network or its elements to compensate for or offset degradations within the network.

Thus, in accordance with the above, the aforementioned objectives are effectively attained.

Having thus described my invention, what I claim is:

1. A data communications system comprising: first data terminal equipment provided at a first location; second data terminal equipment provided at a second location; first communications equipment at said first location interconnected with said first data terminal equipment; second communications equipment at said second location interconnected with said second data terminal equipment; a communications channel interconnecting said first and second communications equipment; a first auxiliary signal processor at said first location interfaced with said first communications equipment; a second auxiliary signal processor at said second location interfaced with said second communications equipment, said auxiliary signal processors being adapted to compute and store information relating to the performance of the communications channel; a central controller; first auxiliary communications equipment at said first location interfaced with said first auxiliary signal processor; second auxiliary communications equipment at said second location interfaced with said second auxiliary signal processor; and a communications link interconnecting said first and second auxiliary communications equipment with said central controller.

2. The system in accordance with claim 1 wherein said auxiliary communications equipment operate at frequency outside the band width of frequencies at which said communications equipment operate.

3. The system in accordance with claim 1 wherein said auxiliary communications equipment transmit and/or receive information at a data bit rate different from the rate at which said communications equipment transmit and/or receive information.

4. The system in accordance with claim 2 wherein said auxiliary communications equipment transmit and/or receive information at a data bit rate different from the rate at which said communications equipment transmit and/or receive information.

* * * * *